United States Patent
Khorashadi et al.

(10) Patent No.: US 8,538,760 B2
(45) Date of Patent: Sep. 17, 2013

(54) METHODS AND APPARATUSES FOR IDENTIFYING AUDIBLE SAMPLES FOR USE IN A SPEECH RECOGNITION CAPABILITY OF A MOBILE DEVICE

(75) Inventors: Behrooz Khorashadi, Mountain View, CA (US); Saumitra Mohan Das, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 439 days.

(21) Appl. No.: 12/835,329

(22) Filed: Jul. 13, 2010

(65) Prior Publication Data
US 2012/0016670 A1    Jan. 19, 2012

(51) Int. Cl.
| G06F 17/27 | (2006.01) |
| G10L 15/00 | (2013.01) |
| G10L 21/00 | (2013.01) |
| H04M 1/64 | (2006.01) |
| G08G 1/123 | (2006.01) |
| G01C 21/00 | (2006.01) |

(52) U.S. Cl.
USPC ............... 704/275; 704/9; 704/231; 704/257; 704/270; 379/88.01; 701/400; 701/409; 701/426; 701/427; 701/434; 701/532; 701/539; 701/540

(58) Field of Classification Search
USPC .......... 704/231, 9, 257, 275, 270; 379/88.01; 701/532, 539, 400, 540, 426, 409, 427, 434
See application file for complete search history.

(56) References Cited

U.S. PATENT DOCUMENTS

| 6,807,478 | B2 * | 10/2004 | Giannopoulos et al. | 701/434 |
| 7,020,612 | B2 * | 3/2006 | Tamura | 704/275 |
| 7,076,255 | B2 | 7/2006 | Parupudi et al. | |
| 7,225,125 | B2 * | 5/2007 | Bennett et al. | 704/233 |
| 7,272,377 | B2 | 9/2007 | Cox et al. | |
| 7,328,155 | B2 * | 2/2008 | Endo et al. | 704/251 |
| 7,533,020 | B2 * | 5/2009 | Arnold et al. | 704/257 |
| 7,711,571 | B2 | 5/2010 | Heiner et al. | |
| 7,774,132 | B2 * | 8/2010 | DeGrazia | 701/420 |
| 8,155,872 | B2 * | 4/2012 | Kjeldsen et al. | 701/425 |
| 8,255,217 | B2 * | 8/2012 | Stent et al. | 704/243 |
| 2003/0125869 | A1 * | 7/2003 | Adams, Jr. | 701/200 |
| 2008/0091435 | A1 * | 4/2008 | Strope et al. | 704/277 |
| 2009/0043502 | A1 * | 2/2009 | Shaffer et al. | 701/213 |
| 2009/0048820 | A1 | 2/2009 | Buccella | |
| 2009/0204409 | A1 * | 8/2009 | Mozer et al. | 704/275 |
| 2009/0228281 | A1 * | 9/2009 | Singleton et al. | 704/275 |
| 2010/0191520 | A1 * | 7/2010 | Gruhn et al. | 704/9 |
| 2010/0217604 | A1 * | 8/2010 | Baldwin et al. | 704/275 |
| 2010/0312469 | A1 * | 12/2010 | Chen | 701/207 |

OTHER PUBLICATIONS

Ashwin Shenoy U. "Location Based Translators," Siemens AG, Juergen Carstens. Oct. 25, 2006, Bangalore, India, pp. 1-2.

* cited by examiner

*Primary Examiner* — Paras D Shah
(74) *Attorney, Agent, or Firm* — Jennifer M. Pascua

(57) ABSTRACT

Techniques for provided which may be implemented using various methods and/or apparatuses in a mobile device to allow for speech recognition based, at least in part, on context information associated with at least a portion of at least one navigational region, e.g., associated with a location of the mobile device. A speech recognition capability may, for example, be provided with a set of audible samples based, at least in part, on the context information. Such speech recognition capability may be provided by the mobile device and/or by one or more other devices coupled to the mobile device.

24 Claims, 3 Drawing Sheets

METHODS AND APPARATUSES FOR IDENTIFYING AUDIBLE SAMPLES FOR USE IN A SPEECH RECOGNITION CAPABILITY OF A MOBILE DEVICE

BACKGROUND

1. Field

The subject matter disclosed herein relates to electronic devices, and more particularly to methods and apparatuses for use in or with a mobile device to identify audible samples for use in a speech recognition capability.

2. Information

Mobile devices (e.g., cellular/smart phones, PDAs, notebook computers, navigation devices, etc.) may receive user inputs through various user interfaces. For example, one or more buttons may be provided in a keypad or through a touch screen. Additionally, in some devices a speech recognition capability may be provided. A speech recognition capability may, for example, compare speech samples obtained from a microphone with audible samples that may be stored in memory or on a server in a network or computing cloud. The audible samples may, for example, relate to words or phrases or portions thereof which have been provided in advance. In certain instances, there may be a training process conducted during which the speech recognition capability attempts to refine and/or establish audible samples that a user may provide in the future. For example, as part of a training process a user may be asked to read text passages and/or pronounce certain words.

In certain implementations, a speech recognition capability may become very complex and require significant processing capabilities and memory storage capabilities. Indeed, for some mobile devices it may be more efficient to transmit speech samples over a network (e.g., a wireless network) to one or more other computing devices which provide all or part of the speech recognition capability. Unfortunately, there may be situations wherein a mobile device may temporarily lack network access and/or network performance may result in slow response times. In other situations, an on-board speech recognition capability may be significantly limited to just an established set of audible samples which may not always be applicable or useful to a user of a mobile device. Hence, a user may decide to simply forego or avoid the use of speech-based inputs.

SUMMARY

In accordance with certain aspects, techniques for provided which may be implemented using various methods and/or apparatuses to allow a mobile device to perform or assist other devices in performing speech recognition.

For example, certain techniques allow a mobile device to obtain context information that is associated with at least a portion of at least one navigational region, and to identify a set of audible samples that may be used by a speech recognition capability based, at least in part, on the context information. In this manner, the audible samples may correspond more closely to certain speech inputs from the user with regard with the navigational region and/or items of interest therein or associated therewith.

Thus, in certain example implementations, user input may be received and processed using a speech recognition capability that is tuned to a navigational region and an operation of at least one process within the mobile device may be affected. For example, a location or navigation process may be affected based on speech recognized user input.

In certain example implementations, such context information may be received from a location based service, one or more remote devices, etc. For example, an access point device or the like may transmit map information and/or the like that is associated with at least a portion of at least one navigational region, and a mobile device may receive such map information or the like and extract applicable context information there from. As such, the resulting set of audible samples may be fine tuned or otherwise prove to be more applicable to user input speech relating to the navigational region, for example.

In certain example implementations, a navigational region may be associated with an estimated location of the mobile device. For example, a navigational region may comprise or otherwise relate to at least a portion of one or more natural and/or manmade structures, and/or at least a portion of one or more items of interest (e.g., objects, locations, paths, entities, services, people, etc.).

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
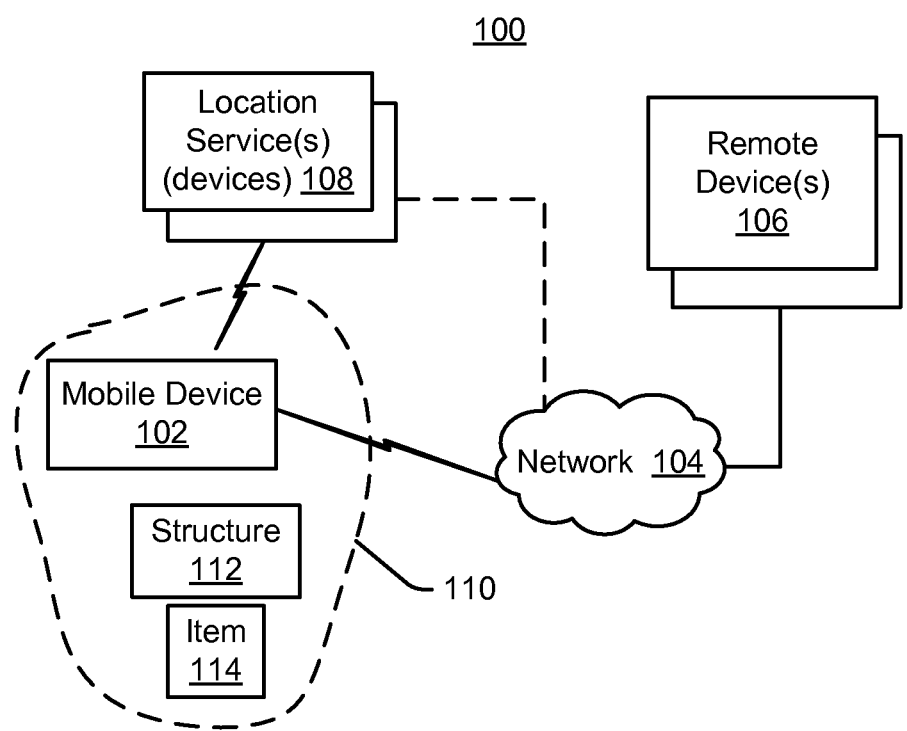
FIG. 1 is a schematic block diagram illustrating an exemplary environment that includes a mobile device to identify audible samples for use in a speech recognition capability, in accordance with an implementation.

In accordance with certain aspects, techniques for provided which may be implemented using various methods and/or apparatuses to allow a mobile device to perform speech recognition based, at least in part, on context information associated with at least a portion of at least one navigational region.

Such a navigational region may be associated with an estimated location of a mobile device. Thus, for example, a mobile device may be near and/or within such navigational region, or expected to be near and/or within such navigational region in the future.

As such, a mobile device may obtain one or more electrical signals representing context information associated with at least a portion of at least one navigational region, and identify a set of audible samples for use by a speech recognition capability based, at least in part, on the context information. By way of example, a mobile device may receive map information relating to navigational region, and extract context information from the map information. The map information may be stored within the mobile device in advance and/or received via network from a location based service and/or one or more remote devices.

In certain example implementations, a map and/or other like context information file may provide information associated with one or more structures and/or portions thereof. For example, a CAD file may be obtained by the mobile device for one or more buildings, and/or other like navigational regions.

In certain example implementations, a map and/or other like context information file may provide information associated with in item of interest. Here, for example, an item of interest may comprise an object, a person, a specific location, etc. Thus, for example, a data file may be obtained by the mobile device which identifies a location of a room, a product, a meeting, a hospital, a friend, etc.

In certain example implementations, a map and/or other like context information file may comprise a plurality of informational layers associated with a navigational region. For example, a first informational layer may be associated with a shopping mall, a second informational layer may be associated with a retail store in the shopping mall, a third informational layer may be associated with a particular floor or section of the retail store, and a fourth informational layer may be associated with products available on such floor or within such section of the retail store. While in this example, the informational layers may be nested and/or otherwise relate to some hierarchical arrangement, it is recognized that in other example implementations a relationship between layers may be more complex, minimal, or nonexistent. For example, the fourth informational layer in the example above may also be associated with another retail store (e.g., there may be one or more other stores in the shopping mall or region offering the same or similarly identifiable products).

Continuing with the shopping mall example above, in certain example implementations, a mobile device may obtain a map for the shopping mall and/or store therein in advance or perhaps upon entering or approaching such navigational region. In certain example implementations, such map or other like context information may be received from a location based service available via a serving wireless communication system provider and/or the like, and/or possibly via one or more remote devices locally associated with the navigational region. For example, a retail store may provide such information using a wireless local area network and/or the like for use by its patrons.

In certain example implementations, a mobile device may identify a set of audible samples that may be a particular usefulness with regard to a speech recognition capability while the mobile device and user are within or near the navigational region. Context information in a map and/or other like data file may, for example, comprise at least one identifier (e.g., a word, number, etc.) that may be associated with one or more audible phrases comprising one or more audible samples. For example, a map may comprise a word that identifies a store by its name; and such word may comprise one or more audible phrases comprising one or more audible samples applicable to a speech recognition capability.

In certain example implementations, all or part of the context information, an audible phrase, and/or an audible sample may comprise or otherwise be based, at least in part, on (or otherwise associated with) a standardized syntax representation, such as, e.g., a "grammar". Here, by way of non-limiting example, the World Wide Web Consortium (W3C) has published a standard known as the Speech Recognition Grammar Specification, which defines syntax for representing grammars for use in speech recognition.

In certain example implementations, one or more grammars in a local context information file may comprise a set of permissible entity, item, or person names/identifiers that may be of interest in a navigational region. Likewise, for example, a grammar may indicate a room number or the like, "200A" using alphanumeric characters (here, e.g., using three numerical digits and a letter), or other like representation.

Those skilled in the art will recognize that the type, format, and/or nature of audible samples may vary depending on type of speech recognition capability that is employed. As speech recognition capabilities are known and continue to be developed or improved, such techniques are understood and well known.

Thus, in certain instances, a mobile device may identify a new set of audible samples applicable to a navigational region or portion thereof. In other example implementations, a mobile device may already comprise an initial set of audible samples associated with a speech recognition capability and may reduce in some manner the initial set based, at least in part, on the context information. Here, for example, a mobile device may prune an initial set of audible samples and/or otherwise selectively weight (e.g., logically, probabilistically, etc.) certain audible samples in some manner based on context information associated with the navigational region. In certain example implementations, subsets of audible samples may be identified as corresponding to different informational layers.

In certain example implementations, a mobile device may obtain one or more electrical signals representing a speech sample (e.g., via a microphone, from memory, etc.), and identify a user input via the speech recognition capability using such speech sample and the set of audible samples. In response to such user input, operation of at least one process within the mobile device may be affected. For example, a user may state an identifier (e.g., a name) of an item of interest (e.g., a store, a product) and in response to recognizing such user input through the speech recognition capability, a location or navigation process may be affected in some manner. Here, for example, a user may be presented with visual and/or audible information (via a display or speaker) that may guide the user to the item of interest or otherwise inform the user about the item of interest.

In another example, a user may state an identifier (e.g., a word) of an item of interest (e.g., an event, an entity) and in response to recognizing such user input through the speech recognition capability, a communication process may be affected in some manner. Here, for example, a user may initiate a communication (e.g., a telephone call, an electronic message, etc.) with regard to an event taking place in the navigational region or an entity serving or otherwise associated with the navigational region. Here, such event and/or entity may be identified via the context information associated with the navigational region.

Attention is drawn now to FIG. 1, which is a schematic block diagram illustrating an example environment 100 comprising a mobile device 102, a network 104, one or more remotes device(s) 106, and one or more location service(s) 108.

Mobile device 102 is representative of any electronic device that may be reasonably be moved about by a user. By way of example but not limitation, mobile device 102 may comprise a computing and/or communication device such as a mobile telephone, smart phone, lap top computer, tablet computer, a personal computer, a wearable computer, a personal digital assistant, navigation device, etc.

Device 102 may, for example, be enabled (e.g., via one or more network interfaces) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

Network 104 is representative of one or more wired and/or wireless communication networks and/or the like which enables communication between mobile device 102 and remote device(s) 106. By way of example, network 104 may include a telecommunications and/or data network and/or services, cellular and/or other wireless networks, an intranet, the Internet, etc. Thus, network 104 may comprise an access point, a base station, one or more computing and/or communication resources, etc. In certain instances, network 104 may comprise a "cloud" computing resource and/or the like.

Remote devices 106 may comprise, for example, one or more computing devices, communication devices/resources, data storage devices, etc.

Location service(s) 108 is representative of one or more wireless signal based location services such as, a GNSS (e.g., GPS, etc.) or other like satellite and/or terrestrial locating service, a location based service (e.g., via a cellular network, a WiFi network, etc.). In certain example implementations, location based services or the like may be provided by and/or otherwise supported in some manner via other resources within network 104 and/or one or more remote devices 106.

As illustrated in FIG. 1, environment 100 may include a navigational region 110 within which one or more structures 112 and/or items of interest 114 may be provided. As illustrated, at certain times mobile device 102 may be within or partially within navigational region 110. At other times, for example, mobile device 102 may be outside of navigational region 110. Although not shown, it should be recognized that two or more navigational regions may overlap in some manner and/or one navigational region comprise one or more other navigational regions.

Structure 112 may be representative of any man-made structure (e.g., a city, a building, a floor, a room, a ship, a rail way, a road way, etc.) or portion thereof which may be within at least one navigational region 110. Structure 112 may be representative of any other natural or other like occurring feature (e.g., a mountain range, a canyon, a river way, a coastline, a park, etc.) or portion thereof which may be within at least one navigational region 110.

Item of interest 114 may be representative of any object, including an identifiable person, entity, or service, which may be at least partially physically located within and/or otherwise associated with (e.g., serving, servicing, monitoring, etc.) at a portion of least one navigational region 110. For example, an item of interest may comprise a product or other object(s), a building, a floor, a room, an entrance/exit, a staircase, an elevator, a help desk, a restroom, a cashier, a first aid station, a fire extinguisher, a police post, a post office box, a departure gate, a bus or train station/platform, a taxi stand, a parking garage or spot, a restaurant, a friend, a bridge, a walkway, etc.

In certain example implementations, item of interest 114 may comprise an event that may occur or be scheduled to occur. For example, an airline flight's arrival/departure may be an item of interest in a navigational region 110 (e.g., an airport) and for which content information may be obtained by mobile device 102 via network 104 from one or more remote devices 106. Here, for example, a set of audible samples may be extracted from an airline's flight schedule and used by a speech recognition capability to identify user input. For example, a user may state an airline carrier's name, a flight destination or number, and/or the like into a microphone to produce a speech sample which may be compared to the set of audible samples using a speech recognition capability. A resulting user input may then be used to affect an operation of at least one process within mobile device 102. Here, for example, a location or navigation process may be affected in some manner to direct or guide a user of the mobile device to an applicable departure/arrival gate or other location within the airport or portion thereof. In another setting, a communication process may be affected in some manner. For example, the resulting user input may be converted to text (e.g., via the speech recognition capability) and such text may be included in an electronic message. Here, for example, such resulting text that may be provided to a communication process (e.g., SMS service, e-mail service, etc.) may be highly relevant and/or possible substantially unique given the context of the navigational region (e.g., airport) and item of interest (e.g., a particular flight).

Thus, as may be appreciated, having a reduced or specifically focused set of audible samples associated with a navigational region 110 and in particular with regard to structures 112 and/or items of interest 114 therein, available for a speech recognition capability may significantly improve the efficiency and/or accuracy of recognizing a user's verbal inputs through the use of a speech recognition capability employed in a mobile device and/or otherwise provided by a network resource, cloud computing arrangement, etc.

Figure 2:
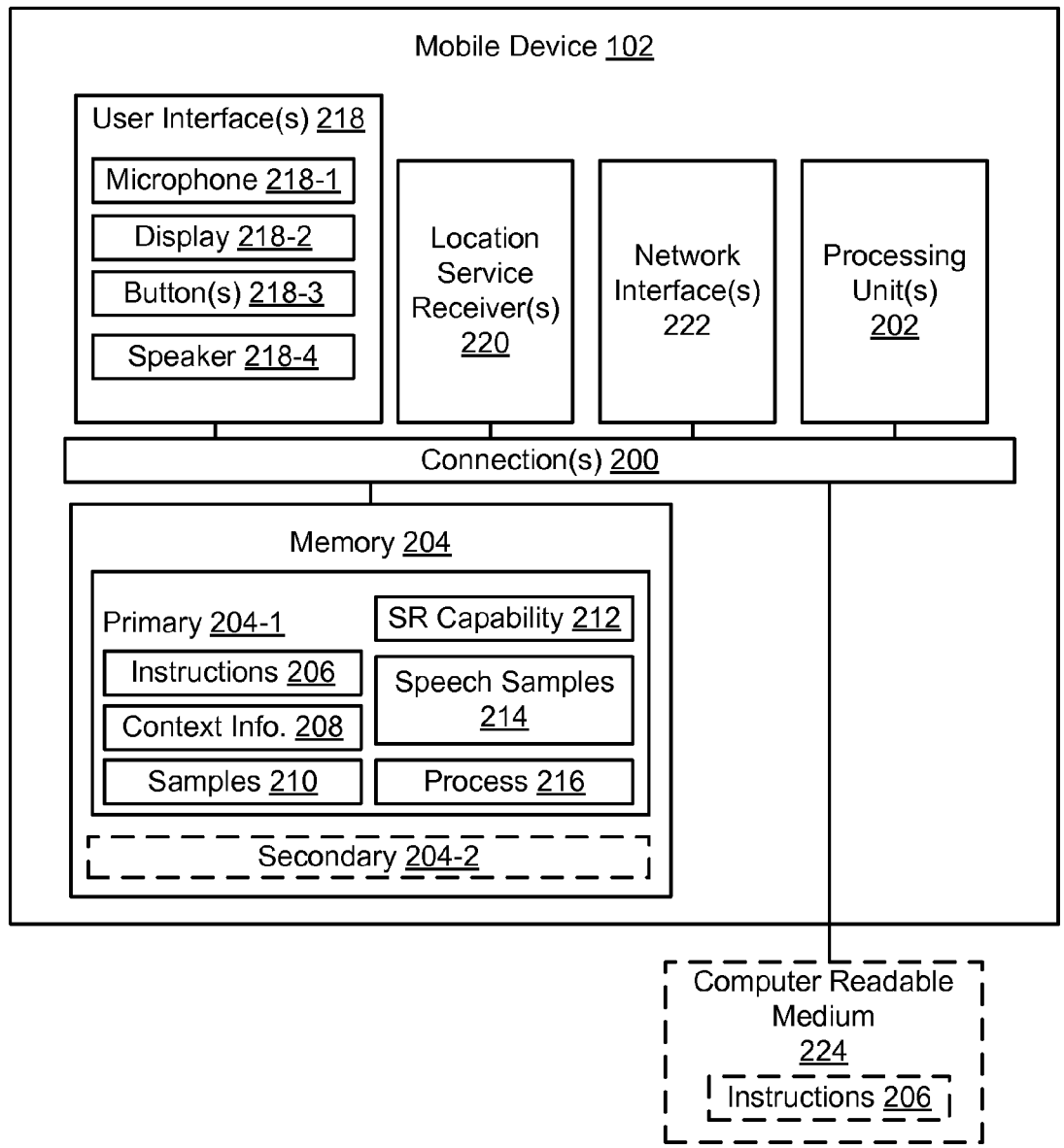
FIG. 2 is a schematic block diagram illustrating certain features of a mobile device, for example as in FIG. 1, capable of identifying audible samples for use in a speech recognition capability, in accordance with an implementation.

Reference is made next to FIG. 2, which is a schematic block diagram illustrating certain features of mobile device 102, for example as in FIG. 1, in accordance with an implementation.

As illustrated mobile device 102 may comprise one or more processing units 202 to perform data processing (e.g., in accordance with all or part of the techniques provided herein) coupled to memory 204 via one or more connections 200. Processing unit(s) 202 may be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within mobile device 102. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 224. As illustrated, memory 204 and/or computer readable medium 224 may comprise instructions 206 associated with data processing (e.g., in accordance with the techniques provided herein).

As further illustrated, at certain times, memory 204 may comprise context information 208. Context information 208 may be representative of any information associated with a navigational region and/or portion thereof. In certain example implementations, context information 208 may comprise map information with various identifiers associated with structures and/or items of interest. In certain example implementations, context information 208 may comprise a CAD file and/or other like data file associated with a structure. In certain example implementations, context information 208 may comprise a plurality of information layers. In certain example implementations, context information 208 may comprise one or more grammars and/or other like syntax representations of use to a speech recognition engine as may be provided in speech recognition (SR) capability 212.

As further illustrated, at certain times, memory 204 may comprise audible samples 210, wherein at least a portion of audible samples 210 may be associated with context information 208. Audible samples 210 may comprise an initial set of audible samples, and/or a set of audible samples associated with a navigational region and/or portion thereof and which are for use with SR capability 212. While a SR capability 212 is illustrated in FIG. 2 as being at least partially stored in memory 204, it should be understood that a SR capability may be operatively provided in whole or part in one or more of processing unit(s) 202 and/or other like circuitry. For example, as mentioned a speech recognition engine and/or other like speech recognition capability may be provided in a distributed manner using one or more network resources and/or otherwise enabled via a cloud computing arrangement.

In certain example implementations, a set of audible samples associated with a navigational region and/or portion thereof may comprise, at least in part, a subset of an initial set of audible samples. For example, an initial set of audible samples may be reduced to a subset based, at least in part, on context information 208. In certain other example implementations, a set of audible samples associated with a navigational region and/or portion thereof may be provided in addition to or instead of an initial set of audible samples. In certain example implementations, a set of audible samples associated with a navigational region and/or portion thereof may comprise a plurality of subsets of audible samples corresponding to a plurality of information layers identified via context information 208. For example, a plurality of subsets of grammars and/or the like may be associated with a plurality of information layers identified via context information 208.

As further illustrated, at certain times, memory 204 may comprise speech samples 214 for use with SR capability 212. Here, for example, speech samples 214 may be generated by a user interface 218, e.g., having a microphone 218-1. Various known techniques, which are beyond that scope of the present description, are available for converting sound waves to electrical signals and/or digital data for use with various speech recognition capabilities.

As further illustrated, at certain times, memory 204 may comprise one or more processes 216 having an operation that may be affected in some manner in response to user inputs identified using SR capability 214. For example, process 216 may comprise, in whole or part, a location or navigation process, a communication process, and/or other like data processing capability. While process 216 is illustrated in FIG. 2 as being at least partially stored in memory 204, it should be understood that such a process may be operatively provided in whole or part in one or more of processing unit(s) 202 and/or other like circuitry.

Mobile device 102 may, for example, further comprise one or more user interfaces 218, which may be coupled to one or more of connections 200. By way of example, user interfaces 218 may comprise microphone 218-1, a display 218-2, one or more buttons/etc. 218-3, and/or a speaker 218-4, and/or other like user input/output mechanisms.

Mobile device 102 may, for example, as previously mentioned comprise one or more location service receivers 220 and/or network interfaces 222, which may be coupled to one or more of connections 200.

Figure 3:
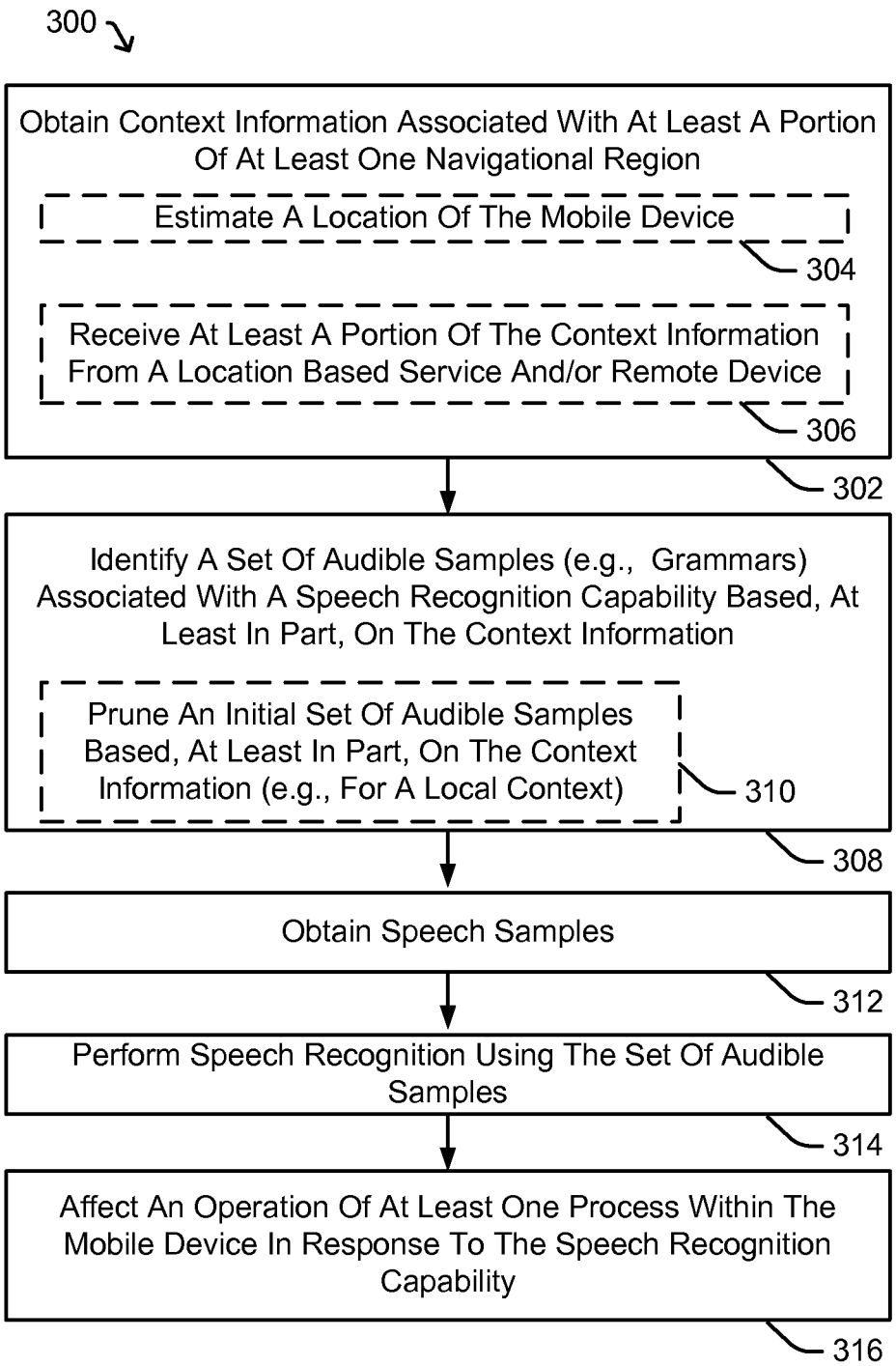
FIG. 3 is a functional flow diagram illustrating certain features of an exemplary process for use in a mobile device to identify audible samples for use in a speech recognition capability, in accordance with an implementation.

Attention is drawn next to FIG. 3, which is flow diagram illustrating an example process 300 for use in a mobile device to select and control a controllable device, in accordance with an implementation.

At block 302, context information associated with at least a portion of at least one navigational region may be obtained. For example, at block 304, a location of a mobile device may be estimated, and/or at block 306, at least a portion of the contract information may be received from a location based service and/or a remote device. In certain example implementations, map information may be obtained and context information extracted or otherwise determined based, at least in part, on the map information.

At block 308, a set of audible samples for use by a speech recognition capability of the mobile device may be identified based, at least in part, on the context information. For example, at block 310, an initial set of audible samples may be reduced based, at least in part, on the context information. In certain instances, for example, a set of grammars associated with a local context may be obtained and/or otherwise provided to a speech recognition capability to prune its search space.

At block 312, at least one speech sample may be obtained, e.g., via a user interface. At block 314, at least one user input may be identified with a speech recognition capability using at least one speech sample and the set of audible samples. In certain example implementations, all or part of block 314 may be provided by a mobile device. In certain other example implementations, all or part of block 314 may be provided by a remote device and/or location service.

At block 316, in response to the identified user input, an operation of at least one process within said mobile device may be affected.

With the techniques provided herein, for example, the resulting set of audible samples may be more applicable to the context of the navigational region and as such the complexity of the speech recognition capability may be reduced and/or recognition accuracy possibly improved.

Indeed, in certain further example implementations, the context information may be specifically designed for use by a mobile device to promote such improvements. For example, a CAD map or other map format may comprise information layers that may be easily managed and/or quickly parsed without extensive computation overhead. Here, for example, a set/subset of audible samples may be associated with an information layer and selected for use (e.g., based on user input, estimated position, etc.).

In certain example implementations, probabilistic pruning of an initial set of audible samples and/or set/subset of identified samples may be used to reduce a probabilistic error of speech recognition. For example, context information that is obtained by a mobile device may be pre-analyzed and/or otherwise configured with information layers and identifiers (e.g., words or sounds) that are more likely to occur based on the layers within a map itself. For example, if there are more "Smiths" within a building than any other surname the probability that a name search with Smith may be identified in some manner as being higher. At a more granular level sound such as "sh" or "agh" may be more prevalent based on navigational region, store names, or other items of interest therein. These can additionally be pre-processed through analysis of a CAD map or the like to increase recognition accuracy.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying" and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising:
at a mobile device:
accessing an electronic map comprising a plurality of ordered informational layers representing a plurality of navigational regions within a building, wherein at least one of said plurality of ordered informational layers is indicative of items of interest that is at least partially located within and/or associated with at least a portion of at least one of said plurality of navigational layers, said items of interest comprising and/or identifying a person, an event, and a product;
determining an initial set of audible samples for use by a speech recognition capability provided at said mobile device based, at least in part, on said electronic map; and
in response to a determination that said mobile device is located within or near at least a portion of said at least one of said plurality of navigation regions based, at least in part, on receiving a wireless signal from a device provisioned as part of a wireless communication network serving at least a portion of at least one of said plurality of navigational regions, identifying a subset of said plurality of ordered informational layers; and
based, at least in part, on said subset of said plurality of ordered informational layers and said items of interest, identifying a subset of audible samples from an initial set of audible samples for use by said speech recognition capability at least while said mobile device is located within or near said portion of said at least one of said plurality of navigational regions.

2. The method as recited in claim 1, further comprising:
at said mobile device:
obtaining one or more electrical signals representing a speech sample; and
identifying a user input via said speech recognition capability using said speech sample and at least said subset of audible samples.

3. The method as recited in claim 2, further comprising:
at said mobile device:
in response to said user input, affecting an operation of at least one process within said mobile device.

4. The method as recited in claim 3, wherein said at least one process comprises a location or navigation process.

5. The method as recited in claim 1, and further comprising:
receiving at least a portion of said electronic map from at least one of: a location based service, or a remote device.

6. The method as recited in claim 1, wherein said set of audible samples corresponds to at least one grammar.

7. An apparatus for use in a mobile device, the apparatus comprising:
means for accessing an electronic map, comprising a plurality of ordered informational layers representing a plurality of navigational regions within said a building, wherein at least one of said plurality of ordered informational layers is indicative of items of interest that is at least partially located within and/or associated with at least a portion of at least one of said plurality of navigational layers, said items of interest comprising and/or identifying a person, an event, and a product;
means for determining an initial set of audible samples for use by a speech recognition capability provided at said mobile device based, at least in part, on said electronic map; and
in response to a determination that said mobile device is located within or near at least a portion of said at least one of said plurality of navigation regions based, at least in part, on receiving a wireless signal from a device provisioned as part of a wireless communication network serving at least a portion of at least one of said plurality of navigational regions, means for identifying a subset of said plurality of ordered informational layers; and
based, at least in part on said subset of said plurality of ordered informational layers and said items of interest, means for identifying a subset of audible samples from an initial set of audible samples for use by said speech recognition capability at least while said mobile device is located within or near said portion of said at least one of said plurality of navigational regions.

8. The apparatus as recited in claim 7, further comprising:
means for obtaining a speech sample; and
means for identifying a user input based, at least in part, on information resulting from said speech recognition capability using said speech sample and at least said subset of audible samples.

9. The apparatus as recited in claim 8, further comprising:
means for affecting an operation of at least one process within said mobile device in response to said user input.

10. The apparatus as recited in claim 9, wherein said at least one process comprises a location or navigation process.

11. The apparatus as recited in claim 7, further comprising:
means for receiving at least a portion of said electronic map from at least one of: a location based service, or a remote device.

12. The apparatus as recited in claim 7, wherein said set of audible samples corresponds to at least one grammar.

13. An apparatus for use in a mobile device, the apparatus comprising:
memory;
at least one processing unit to:
access, via said memory, an electronic map comprising a plurality of ordered informational layers representing a plurality of navigational regions within a building, wherein at least one of said plurality of ordered informational layers is indicative of items of interest that is at least partially located within and/or associated with at least a portion of at least one of said plurality of navigational layers, said items of interest comprising and/or identifying a person, an event, and a product;
determine an initial set of audible samples for use by a speech recognition capability provided at said mobile device based, at least in part, on said electronic map; and
in response to a determination that said mobile device is located within or near at least a portion of said at least one of said plurality of navigation regions based, at least in part, on receiving a wireless signal from a device provisioned as part of a wireless communication network serving at least a portion of at least one of said plurality of navigational regions, identify a subset of said plurality of ordered informational layers; and
based, at least in part, on said subset of said plurality of ordered informational layers and said items of interest identify a subset of audible samples from an initial set of audible samples for use by said speech recognition capability at least while said mobile device is located within or near said portion of said at least one of said plurality of navigational regions.

14. The apparatus as recited in claim 13, further comprising:
a microphone; and wherein said at least one processing unit to further access a speech sample obtained via said microphone, and identify a user input based, at least in part, on information resulting from said speech recognition capability using said speech sample and at least said subset of audible samples.

15. The apparatus as recited in claim 14, wherein said at least one processing unit to further affect an operation of at least one process within said mobile device in response to said user input.

16. The apparatus as recited in claim 15, wherein said at least one process comprises a location or navigation process.

17. The apparatus as recited in claim 13, further comprising:
a network interface; and
wherein said at least one processing unit to further obtain at least a portion of said electronic map via said network interface from at least one of: a location based service, or a remote device.

18. The apparatus as recited in claim 13, wherein said set of audible samples corresponds to at least one grammar.

19. An article comprising:
a non-transitory computer readable medium having stored therein computer implementable instructions executable by one or more processing units of a mobile device to:
access an electronic map comprising a plurality of ordered informational layers representing a plurality of navigational regions within said a building, wherein at least one of said plurality of ordered informational layers is indicative of items of interest that is at least partially located within and/or associated with at least a portion of at least one of said plurality of navigational layers, said items of interest comprising and/or identifying a person, an event, and a product;
determine an initial set of audible samples for use by a speech recognition capability provided at said mobile device based, at least in part, on said electronic map; and
in response to a determination that said mobile device is located within or near at least a portion of said at least one of said plurality of navigation regions based, at least in part, on receiving a wireless signal from a device provisioned as part of a wireless communication network serving at least a portion of at least one of said plurality of navigational regions, identify a subset of said plurality of ordered informational layers; and
based, at least in part, on said subset of said plurality of ordered informational layers and said items of interest, identify a subset of audible samples from an initial set of audible samples for use by said speech recognition capability at least while said mobile device is located within or near said portion of said at least one of said plurality of navigational regions.

20. The article as recited in claim 19, wherein said computer implementable instructions are further executable by said one or more processing units to:
identify a user input based, at least in part, on information resulting from said speech recognition capability using a speech sample and at least said subset of audible samples.

21. The article as recited in claim 20, wherein said computer implementable instructions are further executable by said one or more processing units to:
affect an operation of at least one process within said mobile device in response to said user input.

22. The article as recited in claim 21, wherein said at least one process comprises a location or navigation process.

23. The article as recited in claim 19, wherein at least a portion of said electronic map is obtained from at least one of: a location based service, or a remote device.

24. The article as recited in claim 19, wherein at least one of said set of audible samples corresponds to at least one grammar.

* * * * *